US008935924B2

(12) United States Patent
Takeda et al.

(10) Patent No.: US 8,935,924 B2
(45) Date of Patent: Jan. 20, 2015

(54) DRIVING DEVICE AND AN OPERATION METHOD OF A COMPRESSOR

(75) Inventors: Kazuhiro Takeda, Hiroshima (JP); Yoshiyuki Okamoto, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 950 days.

(21) Appl. No.: 13/059,721

(22) PCT Filed: Aug. 31, 2009

(86) PCT No.: PCT/JP2009/065164
§ 371 (c)(1), (2), (4) Date: Feb. 28, 2011

(87) PCT Pub. No.: WO2010/055723
PCT Pub. Date: May 20, 2010

(65) Prior Publication Data

US 2011/0138816 A1 Jun. 16, 2011

(30) Foreign Application Priority Data

Nov. 12, 2008 (JP) ................................ 2008-290391

(51) Int. Cl.
*F02C 9/00* (2006.01)
*F01D 25/36* (2006.01)

(52) U.S. Cl.
CPC ............ *F01D 25/36* (2013.01); *F05D 2260/85* (2013.01); *F05D 2270/304* (2013.01)
USPC ................................................ 60/772; 60/788

(58) Field of Classification Search
USPC .............. 60/39.163, 786–788, 792, 801–802, 60/772
See application file for complete search history.

(56) References Cited

U.S. PATENT DOCUMENTS 7,513,120 B2 * 4/2009 Kupratis ......................... 60/791
2005/0056021 A1 * 3/2005 Belokon et al. ................. 60/772

(Continued)

FOREIGN PATENT DOCUMENTS

JP 59-90723 5/1984
JP 10-121908 5/1998

(Continued)

OTHER PUBLICATIONS

Japanese Decision to Grant a Patent issued Nov. 30, 2012 in corresponding Japanese Patent Application No. 2008-290391 with English translation.

(Continued)

*Primary Examiner* — Phutthiwat Wongwian
(74) *Attorney, Agent, or Firm* — Wenderoth, Lind & Ponack, L.L.P.

(57) ABSTRACT

It is desired to obtain a technique which enables turning of a compressor driven by a multi-shaft gas turbine. The multi-shaft gas turbine has a high-pressure side shaft and a low-pressure side shaft. A compressor drive device applies a drive force to a compressor connected to the low-pressure side shaft of the multi-shaft gas turbine. The compressor drive device includes: a motor which generates a drive force; and a control unit which controls the motor so as to generate an rpm when turning the compressor. If the torque generated by the gas turbine is insufficient, the control unit controls the motor so as to carry out a helper motor operation for increasing the torque.

14 Claims, 6 Drawing Sheets

(56) References Cited

U.S. PATENT DOCUMENTS

| | | | | |
|---|---|---|---|---|
| 2012/0000204 | A1* | 1/2012 | Kesseli et al. | 60/778 |
| 2013/0232974 | A1* | 9/2013 | Nakhamkin | 60/643 |

FOREIGN PATENT DOCUMENTS

| | | |
|---|---|---|
| JP | 2005-248751 | 9/2005 |
| JP | 2007-40253 | 2/2007 |

OTHER PUBLICATIONS

International Search Report issued Nov. 24, 2009 in International (PCT) Application No. PCT/JP2009/065164.

Indonesian Notice of Granting issued Sep. 24, 2012 in corresponding Indonesian Application No. W-00201100672 with English translation.

* cited by examiner

DRIVING DEVICE AND AN OPERATION METHOD OF A COMPRESSOR

TECHNICAL FIELD

The present invention relates to a turning of a compressor. The present application claims priority under the Convention based on Japanese patent application No. 2008-290391. Disclosed content of the Japanese patent application is incorporated herein by reference.

BACKGROUND ART

A multi-shaft type gas turbine having driving shafts of two or more is known. For example, a two shaft gas turbine has a high pressure side shaft arranged in an upstream side and a low pressure side shaft arranged in a downstream side. The low pressure side shaft is connected to, for example, a load like a compressor.

During the stop condition of a two shaft gas turbine, a turning operation which rotates the shaft at a low speed by a motor is carried out in order to suppress the thermal deformation of the shaft, and so on. The low pressure side shaft is, in general, not required to carry out turning, mainly because of the shortness of the shaft.

In Patent Document 1, a technique regarding the turning of a low pressure rotor of a gas turbine with two shafts is described.

Prior Art Documents

[Patent Document]

Patent Document 1: Japanese Patent Application Publication JP-A-Showa, 59-90723

SUMMARY OF INVENTION

Recently, a multi-shaft gas turbine plant for driving a large-scale compressor has been required. In such a plant, a low pressure side shaft for driving the compressor is very long, so that the turning thereof is required.

FIG. 1 shows a plant of a reference technique for explaining the present invention. An example of a two shaft gas turbine and a compressor which is driven thereby is shown. The gas turbine 104 includes a compressor, a combustor and a turbine. The gas turbine 104 includes a high pressure side shaft 110 and a low pressure side shaft 112. The high pressure side shaft 110 is connected to the motor 102. The turning of the high pressure side shaft 110 is carried out by the motor 102.

The low pressure side shaft 112 is connected to the compressor 114 and functions as a driving shaft of the compressor 114. A gear of a pickup device for detecting a rotation speed is mounted on the low pressure side shaft 112. The pickup device 120 is installed on a position corresponding to the gear 118.

FIG. 2 shows an electromagnetic speed pickup (MPU, Magnetic Pickup) being an example of the pickup device 120. The gear 118 rotates coaxially and at a same speed with the low pressure side shaft 112. The head 120*a* of the pickup device 120 has a coil and a permanent magnet arranged therein. When the gear 118 rotates near the head 120*a*, caused by the periodic concave and convex pattern (the wheel teeth) in the circumferential direction of the gear 118, the direction between the head 120 and an edge of the gear 118 varies periodically in time series. According to this variation, a current flows in the coil of the head 120. The detection value of the magnitude of the current in time series varies in synchronization with the rotation of the gear 118. The control device 120*b* generates a rotation speed signal indicating the rotation speed of the gear 118 based on the variation of the current.

The motor 116 is connected to the compressor 114. The motor 116 is driven by the variable frequency driving device 122 and the control device 124. The motor 116 drives the low pressure side shaft 112 as a helper motor to assist an output when the output of the turbine 104 is insufficient to drive the compressor 114 under a desired driving condition.

The rotation speed signal generated by the pickup device 120 is inputted to the control device 124. The control device 124 carries out a feedback control of the motor 116 based on the detected rotation speed of the low pressure side shaft 112 indicated by this signal.

When turning of the low pressure side shaft 112 is carried out in such a plant, if an existing helper motor 116 and a rotation speed detection pickup 120 can be used, additional facilities are not required. However, in the electromagnetic speed pickup exemplified in FIG. 2, the voltage is low when the rotation speed of the gear 118 is small. Therefore, it is appropriate for the detection of the rotation speed under a normal operation, but not appropriate for a case where the rotation speed is small (about 100 rpm or less). The rotation speed range under the turning operation is about 10 to 20 rpm, so that the pickup device 120 is not able to generate the rotation speed signal under the turning, and the motor 116 is not able to be appropriately controlled.

An object of the present invention is to provide a technique which enables a turning of a compressor driven by a multi-shaft gas turbine.

According to an aspect of the present invention, a compressor driving device generates a driving power to drive a compressor connected to a low pressure side shaft of a multi-shaft gas turbine having a high pressure side shaft and the low pressure side shaft. The compressor driving device includes: a motor for generating the driving power; and a control section for controlling the motor to generate a turning rotation speed being a rotation speed of a turning of the compressor, and to control the motor to carry out a helper motor drive by which an assist torque is generated for assisting a torque of the gas turbine when a torque generated by the gas turbine is lacking.

According to another aspect of the present invention, a turning for the low pressure side shaft is carried out with the turning of the compressor.

According to further another aspect of the present invention, the compressor driving device further includes: a low speed pickup sensor for detecting a rotation speed of the low pressure side shaft when the turning of the compressor is carried out and output a detection signal for turning indicating the detected rotation speed. The control section controls the motor in accordance based on the detection signal for turning when the turning of the compressor is carried out.

According to further another aspect of the present invention, in the compressor driving device, a rotation speed detection member is arranged on the low pressure side shaft at a position corresponding to the low speed pickup. The low speed pickup has a head and generates the detection signal for turning in time series by detecting a distance between the head and a periodic convex and concave pattern formed on the rotation speed detection member.

According to further another aspect of the present invention, the compressor driving device further includes: a high speed pickup for detecting a rotation speed of the low pressure side shaft and output the detected rotation speed as a helper motor rotation speed signal when the helper motor drive is carried out. The control section controls the motor based on the helper motor rotation speed signal when the helper motor drive is carried out.

According to further another aspect of the present invention, in the compressor driving device according to claim 5, the high speed pickup includes a coil and generates the helper motor rotation speed detection signal based on a periodic variation of a current flowing the coil generated by a moving of a periodic convex and concave pattern of a rotation speed detection member formed on the low pressure side shaft.

According to further another aspect of the present invention, in the compressor driving device, the control section includes a protection circuit for stopping the turning of the compressor when a rotation speed of the low pressure side shaft excesses a predetermined value.

According to an aspect of the present invention, a gas turbine plant includes: a multi-shaft gas turbine which includes a high pressure side shaft and a low pressure side shaft; a compressor connected to the low pressure side shaft; and a compressor driving device for generating a driving power of the compressor according to the present invention.

According to an aspect of the present invention, a driving method of a compressor being connected to a low pressure side shaft of a multi-shaft gas turbine including a high pressure side shaft and the low pressure side shaft includes: controlling the motor to generate a turning rotation speed being a rotation speed of a turning of the compressor; and controlling the motor to carry out a helper motor drive by which an assist torque is generated for assisting a torque of the gas turbine when a torque generated by the gas turbine is lacking.

According to the present invention, a technique which enables a turning of a compressor driven by a multi-shaft gas turbine is provided.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

Best embodiments for implementing the present invention will be explained below with reference to the drawings.

[First Embodiment]

Figure 3:
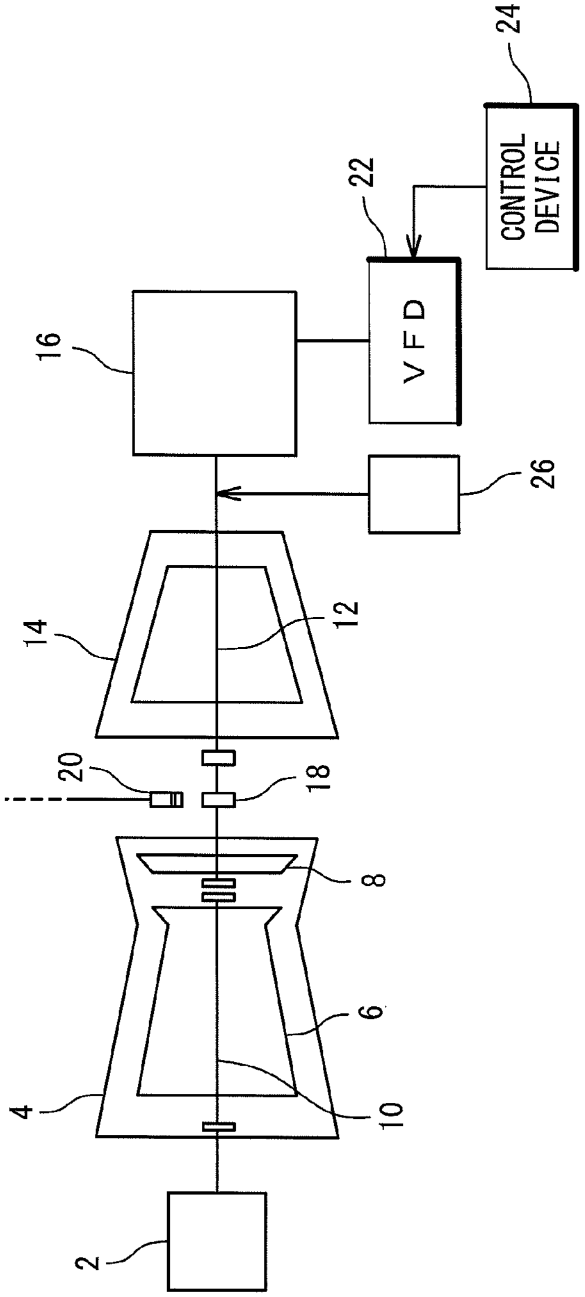
FIG. 3 shows a gas turbine plant according to a first embodiment of the present invention.

An embodiment of the present invention is explained below with reference to the drawings. FIG. 3 shows a two shaft gas turbine plant according to a first embodiment. The gas turbine 4 includes a compressor, a combustor, and a turbine. The compressor takes in and compresses the air. The compressed air is supplied to the combustor. The compressed air and a fuel are combusted in the combustor to generate a combustion gas. The turbine is driven by the combustion gas.

The turbine upstream side 6 includes the combustor and high pressure side blades of the turbine. They are driven by the high pressure side shaft 10. The turbine downstream side 8 includes low pressure side blades driven by the low pressure side shaft 12. The high pressure side shaft 10 and the low pressure side shaft are arranged rotatably around a same axis by the respective bearings. The high pressure side shaft 10 and the low pressure side shaft are not connected structurally and are able to be rotated independently. The low pressure shaft 12 driven via the gas flow, namely, the low pressure side blades are driven by the combustion gas supplied from the high pressure side blades.

The compressor 14 is connected to the gas turbine 4 as a load. This compressor composes a part of another thermal cycle engine and so on which is not shown in the drawings. The compressor 14 of the present embodiment is driven by the low pressure side shaft 12 being a driving shaft. Therefore, as described later, the turning of the low pressure side shaft 12 of the gas turbine 4 is carried out simultaneously by the turning of the compressor 14. The compressor driving device for driving the compressor 14 includes a motor 16 being an electric motor for supplying a torque to the low pressure side shaft 12 being a driving shaft of the compressor 14, and a control unit which controls the motor. The control unit includes a variable frequency driving device 22 and a control device 24. The compressor driving device further includes a gear 18 being a member for detecting the rotation speed of the low pressure side shaft 12 and a high speed pickup 20.

Figure 1:
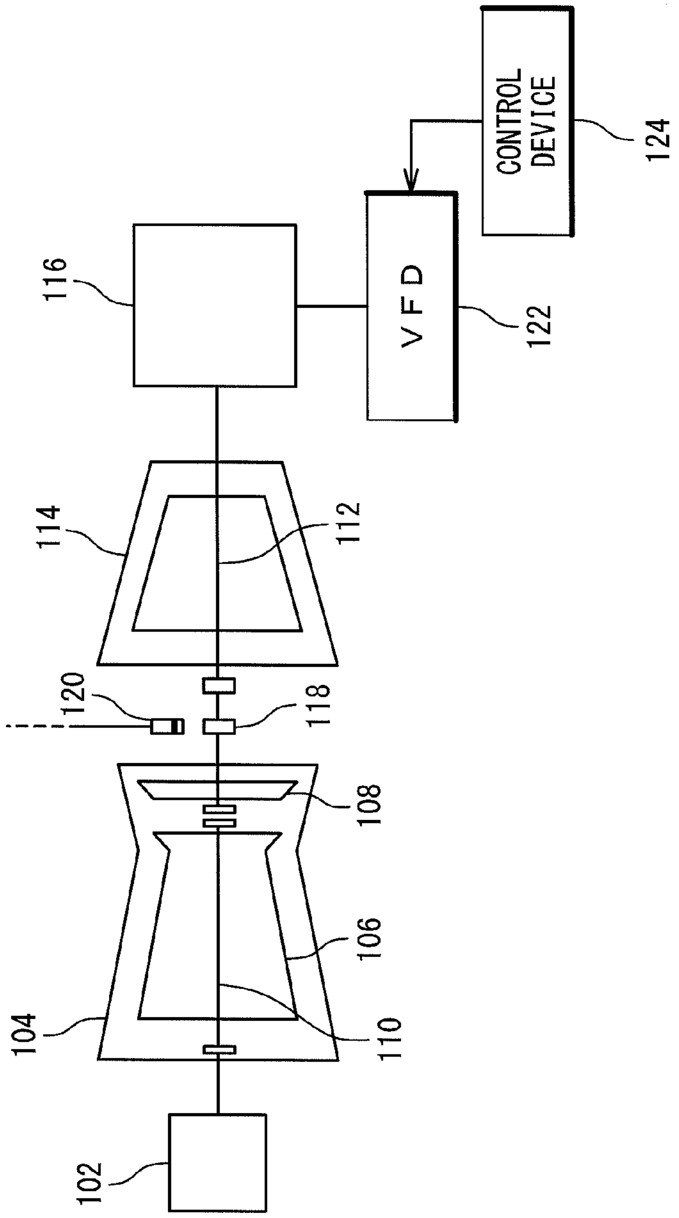
FIG. 1 shows a plant in a reference technique.
Figure 2:
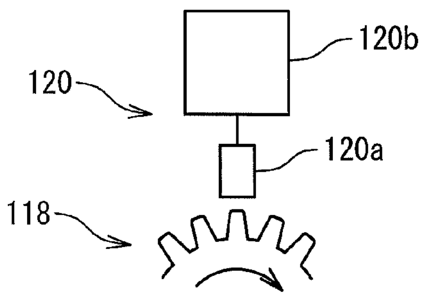
FIG. 2 shows an electromagnetic pickup.

The motor 16 is connected to the compressor 14. The motor 16 is controlled by the variable frequency driving device 22 and the control device 24. The gear 18 is mounted on the low pressure side shaft 12. The gear 18 is rotationally symmetric around the central axis of the low pressure side shaft at a periodic angle, has teeth formed at a predetermined pitch in the circumferential direction, and rotates at a same angular velocity with the low pressure side shaft 12 around the same axis with the low pressure side shaft 12 as the center. The high speed pickup 20 has a head including a permanent magnet and a coil as explained with reference to FIG. 2. When the gear 18 rotates, a current flows in the coil of the head. The current or the voltage waveform of this current shows a waveform being in synchronization with the rotation (more correctly, increase and decrease of the distance with a tooth of the gear 18 near the head) of the gear 18. The high speed pickup 20 generates a rotation speed signal which indicates the rotation speed (rpm) of the low pressure side shaft 12 based on this waveform.

The motor is operated as a helper motor to assist a lacking of the output of the gas turbine 4 to the load of the compressor 14. The variable frequency driving device 22 and the control device 24 determines that the output of the gas turbine is lacking when, for example, with monitoring the detected value of the temperature of the exhaust gas of the gas turbine 4, the increase of the temperature exceeds a predetermined criterion which is preliminary stored. The variable frequency driving device 22 and the control device 24 controls the motor 16 to increase the motor torque as required in response to the determination indicating the output lacking.

Figure 4:
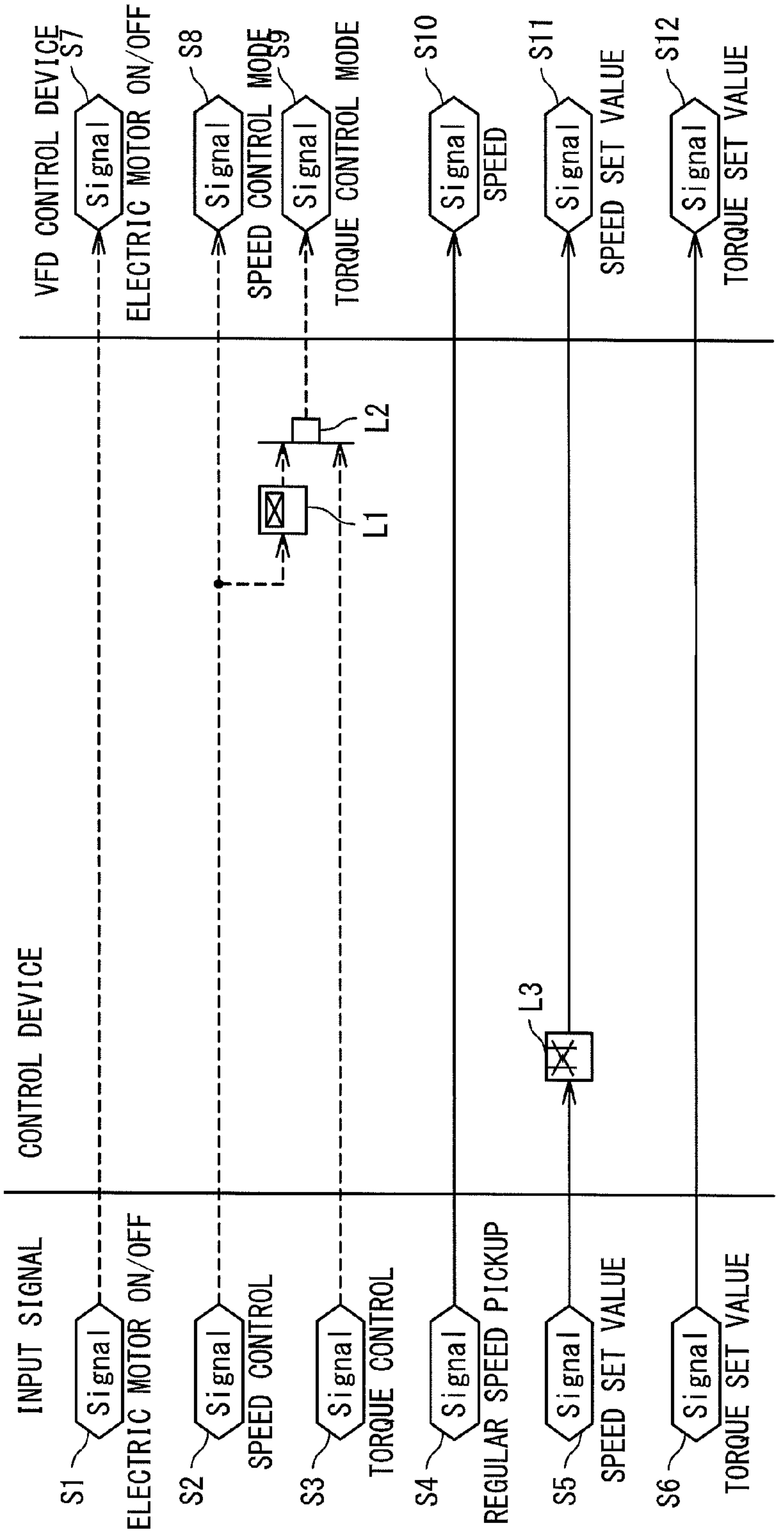
FIG. 4 shows a control logic diagram according to the first embodiment of the present invention.

FIG. 4 is a control logic diagram showing the control carried out by the control device 24. In the left side column of FIG. 4, the signals inputted to the control device 24 are indicated. These are inputted from a higher-level device which carries out setting of operation conditions of the turbine 4, compressor 14 and so on. Or these signals are directly inputted from a detection device like the high speed pickup

20. In the right side column of FIG. 4, the signals generated by the control device 24 in response to the inputted signals and used for control are indicated.

The control device 24 outputs a motor ON/OFF signal S7 for turning on or off the motor 16 in response to the set signal S1 for setting the motor ON/OFF from an outside when the set signal S1 is inputted. When the speed control signal S2 is inputted, the control device 24 generates the signal S8 and is set to the speed control mode. In the speed control mode, the control device 24 controls the motor 16 so that the difference between the rotation speed of the compressor 14 (namely, the detection value of the rotation speed of the low pressure side shaft 12) and the speed set value S5 given from an outside (more precisely, the speed set value S1 after limited by the limiter L3). The control device 24 generates the speed signal S10 based on the rotation speed signal S4 outputted by the high speed pickup 20 to use as the detection value of the rotation speed.

The control device 24 generates the signal S9 and is set to the torque control mode when the set signal S3 for setting to the torque control mode is inputted. At this time, the control signal S9 is outputted under the condition that the set signal S2 indicates that the speed control setting by the logic elements L1, L2. In the torque control mode, the control device 24 controls the motor 16 so that the difference between the detection value of the torque of the compressor 14 (namely, the torque of the low pressure side shaft 12) and the torque set value S6 given from an outside becomes small. According to the above control, the motor 16 is controlled in a case of the start up of the plant and a case where the output of the gas turbine 4 is lacking to the load.

The turning device 26 is installed to be able to connect to the low pressure side shaft 12 of such a plant. The turning device 26 is connected to the low pressure side shaft 12 via a gear mechanism. This gear mechanism is detached from the low pressure side shaft when the turning is finished. Therefore, the load of the turning device 26 is not applied to the low pressure side shaft 12 under a normal operation. For this plant, the turning is carried out in a period where the normal operation of the gas turbine 4 is stopped. The turning of the high pressure side shaft 10 is carried out by the motor 2. The turning of the low pressure side shaft 12 being a rotation shaft of the compressor 14 is carried out by the turning device 26. By such turning operations, even for a plant which drives a large-size compressor, it is possible to solve problems like a deformation of the driving shaft of the compressor by turning.

[Second Embodiment]

Figure 5:
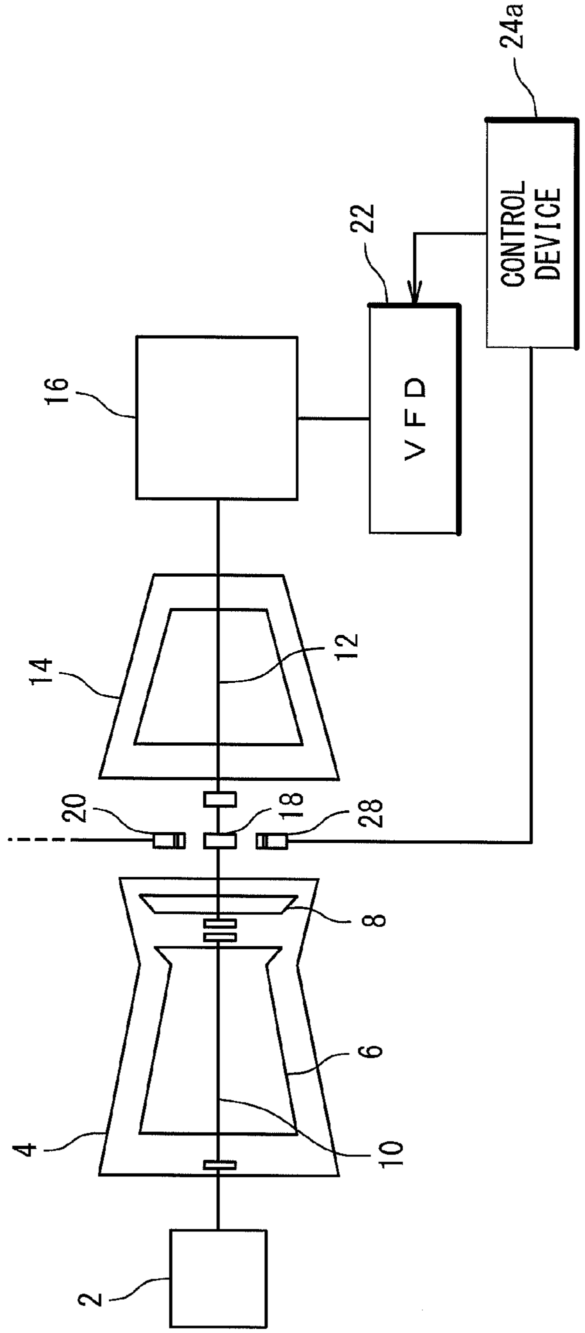
FIG. 5 shows a gas turbine plant according to a second embodiment of the present invention.

FIG. 5 shows a configuration of a two shaft gas turbine plant according to a second embodiment of the present invention. The followings are same to the first embodiment: motor 2; gas turbine 4; high pressure side shaft 10; low pressure side shaft 12; compressor 14; motor 16; variable frequency driving device 22; high speed pickup 20.

The plant according to this embodiment is different from that of the first embodiment in that the low speed pickup 28 is installed, and the control logic of the control device 24*a* is different. As a result of the difference, as explained below in detail, the turning device 26 of the second embodiment which is dedicated to the turning of the compressor is not required.

The low speed pickup 28 detects the rotation speed of the low pressure side shaft 12 using the gear 18 mounted on the low pressure side shaft 12. The gear 18 may be the gear 18 of the high speed pickup 20 used in the normal operation, and also may be a gear dedicated to the low speed pickup 28.

The low speed pickup is a detector being appropriate for detecting the rotation speed of the low pressure side shaft 12 during the turning operation of the compressor 14. As an example of such a detector, there is a displacement sensor which detects the distance between a head of the detector and a target object in real time to generate a detection signal indicating the distance. By measuring the distance between the head and the convex-concave pattern which is formed by the teeth of the gear and is periodic in the circumferential direction in time series, the detection signal which varies periodically in synchronization with the timing of the teeth passing near the head in accordance with the gear rotation is obtained. The rotation speed of the low pressure side shaft 12 can be detected from the detection signal.

An example of the displacement sensor is explained below. The displacement sensor includes a coil in the head. By flowing a high frequency current in the coil of the head from a power source connected to the displacement sensor, a high frequency magnetic field is generated. By this high frequency magnetic field, an eddy current flows in a metallic target object near the head. By detecting the variation of the impedance of the coil caused by the flow of the eddy current, the distance between the head and the target object can be detected.

When a detection device which can detect the rotation speed in a range including both of the rotation speed of the motor 16 in use as the helper motor and the rotation speed under the turning, both function of the high speed pickup 20 and the low speed pickup 28 can be realized by such a detection device. When it is difficult to prepare such a detection device, by preparing the detection devices which are dedicated to the high speed rotation and low speed rotation respectively as shown in FIG. 5, the control under the turning can be realized at low cost.

Figure 6:
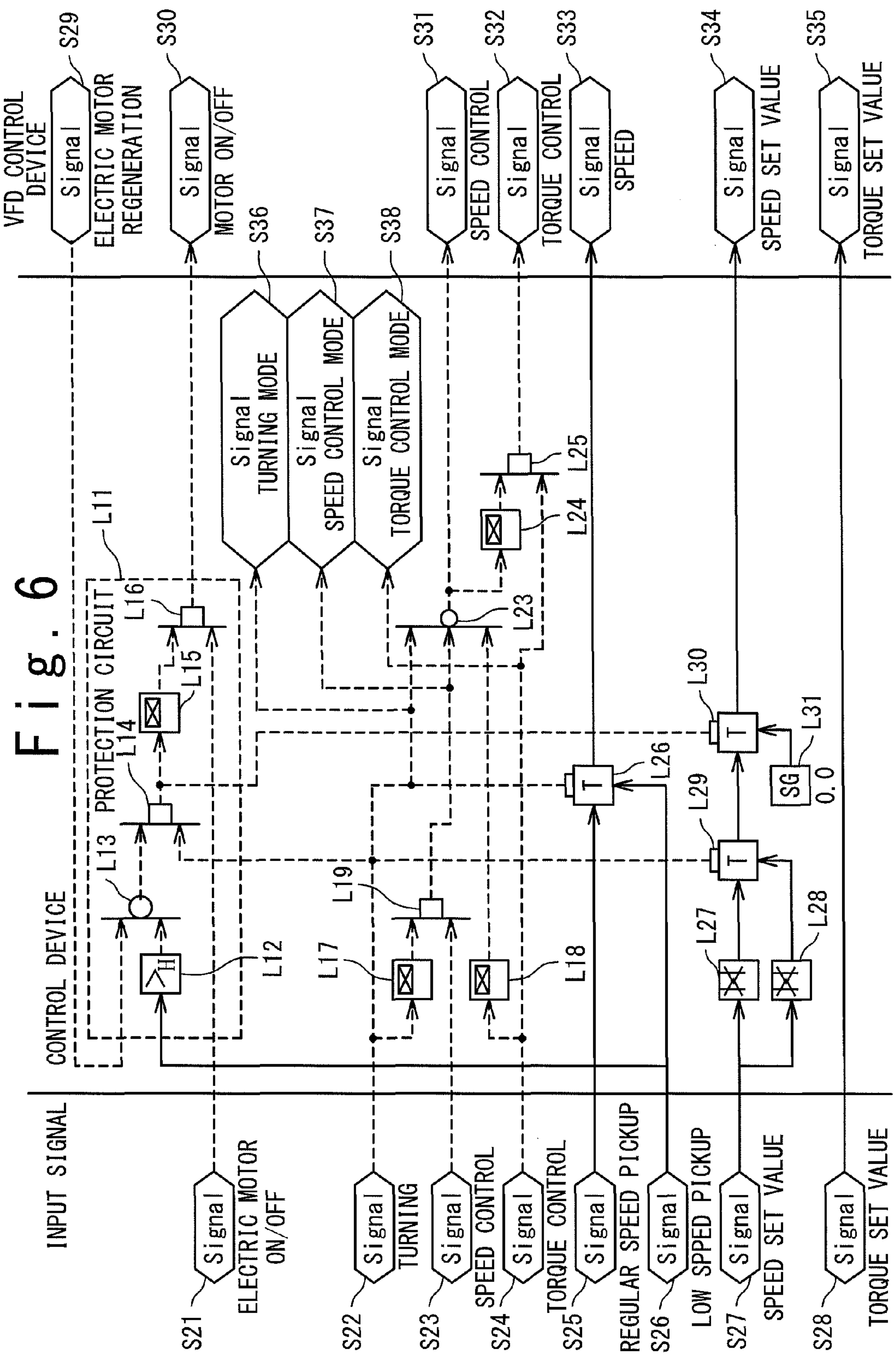
FIG. 6 shows a control logic diagram according to the second embodiment of the present invention.

FIG. 6 is a control logic diagram showing a control carried out by the control device 24*a*. In the left side column of FIG. 6, signals inputted to the control device 24*a* are indicated. These are inputted form a higher-level device which carries out setting of operation conditions of the turbine 4, compressor 14 and so on. Or these signals are directly inputted from a detection device like the high speed pickup 20 or the low speed pickup 28. In the right side column of FIG. 6, the signals generated by the control device 24*a* in response to the inputted signals are indicated. In the following description of the various ON/OFF controls in this control logic, the ON and OFF are represented by the value 1 and 0, respectively.

The control device 24*a* includes a protection circuit L11. The protection circuit L11 outputs the motor ON/OFF signal S30 which indicates that the motor is turned ON only in a case where a predetermined condition is satisfied when the value 1 indicating that the motor is turned ON is inputted as the set signal S21 for setting the motor ON/OFF. When the condition is not satisfied, the protection operation is carried out by outputting the motor ON/OFF signal S30 for turning off the motor.

The protection circuit L11 includes a comparator L12. The comparator L12 inputs the signal S26 which indicates the rotation speed of the low pressure side shaft 12 detected by the low speed pickup 28. When the inputted rotation speed is a predetermined value or less, the comparator L12 outputs the value 0. When the inputted rotation speed excesses the predetermined value, the comparator L12 outputs the value 1.

The OR element L13 inputs an output of the comparator L12 and the signal S29 which indicates the regeneration operation (being the value 1 when the regeneration operation is carried out and the value 0 when it is not carried out) and is outputted from the control device 24*a*. The AND element L14 inputs the output of the OR element and the set signal S22 (being the value 1 when the turning is carried out and the value 0 when the turning is not carried out) of the turning mode of the motor 16. The output value of the AND element L14 is inverted by the inverter L15 and inputted to a terminal of the AND element L16. The set signal S21 of the motor ON/OFF is inputted to another terminal of the AND element L16.

By such a protection circuit L11, the motor ON/OFF signal S30 takes the value 1 and the control device 24*a* drives the motor 16 only when the set signal S21 of the motor ON/OFF is the value 1, and the following conditions are satisfied.

(1) The motor 16 does not carry out the turning operation of the compressor 14 (the set signal S22 takes the value 0).

(2) The motor 16 is carrying out the turning operation of the compressor 14, the rotation speed of the low pressure side shaft 12 detected by the low speed pickup 28 does not exceed a predetermined value, and the motor 16 is not in the regeneration operation.

By such a protection circuit, it is possible to automatically stop the turning during the output of the set signal S22 to carry out the turning operation of the compressor 14 when the rotation speed of the low pressure side shaft 12 increases to more than a predetermined criterion or when an abnormal event, for example a control to start the regeneration operation of the motor 16 starts, occurs.

Next, the switching of the operation mode (either one of the turning mode, speed control mode, and torque control mode) when the motor drives the low pressure side shaft 12 will be explained. When the value 1 is inputted as the set signal S22 of the turning, the signal S36 indicating to set the control of the motor 16 to the turning is generated. Further, the set signal S22 is inputted to the OR element L23. When the value of the set signal S22 is 1, the output of the OR element L23 is 1, and based on the output of the OR element, the signal S31 to set the speed control is generated. Further, based on the value of the output of the OR element L23 inverted by the inverter L24, the signal S32 to set the torque control is generated. As a result, when the set signal S22 being value 1 is inputted, the signal S31 being value 1 and the signal S32 being value 0 are outputted. Namely, by such a control, when a signal to set to the turning mode is inputted, the torque control is automatically released and the feedback control of the speed is set.

The set signal S22 is further inputted to an input terminal of the AND element L19 via the inverter L17. The set signal S23 of the speed control mode is inputted to another input terminal of the AND element L19. In accordance with the output signal of the AND element L19, the signal S37 which instructs to set the control of the motor 16 to the speed control mode is generated. By this control, the set signal S22 of value 1 which instructs to set to the turning mode functions as the disable signal to the set signal S23 of the speed control mode. As a result, it can be prevented that the speed control mode is erroneously set when the set signal S22 of the turning mode is inputted.

The rotation speed signal generated by the high speed pickup 28 for the normal operation is inputted to the control device 24*a* as the normal rotation speed signal S25. This normal rotation speed signal S25 is treated as a detection value of the rotation speed.

The rotation speed signal generated by the low speed pickup 28 for the turning is inputted to the control device 24*a* as the turning detection signal S26. The normal detection signal S25 and the turning detection signal S26 are inputted to the switch L26. The switch L26 selects and outputs the normal rotation speed signal S25 when the turning set signal S22 has value 0. The switch L26 selects and outputs the turning detection signal S26 when the turning set signal S22 has value 1. The output of the switch L26 is used for the speed control of the motor 16 as the speed detection signal S33.

The upper limit of the speed set value S27 is limited by the high value limiter L27 and the low value limiter L28. The high value limiter L27 limits the rotation speed of the low pressure side shaft 12 during the normal operation (for example, the upper limit 5000rpm). The low value limiter limits the rotation speed of the low pressure side shaft 12 during the turning (for example, the upper limit 20rpm). The switch L29 selects and outputs the output of the high value limiter L27 when the turning set signal S22 has value 0. The switch L29 selects and outputs the low value limiter L28 when the turning set signal S22 has value 1.

The switch L30 selects a signal in response to the output of the AND element L14. Under a normal regular operation or turning, the output of the AND element L14 is value 0. In this case, the switch L30 selects the output of the switch L29 and output it as the speed set value S34. The speed set value S34 is used as the set value of the rotation speed of the low pressure side shaft 12 under the speed control mode.

The output of the AND element L14 is value 1 in the following cases.

(1) A case where the turning set signal S22 has value 1, and the motor regeneration signal S29 has value 1.

(2) A case where the turning set signal S22 has value 1 and the comparator L12 outputs the value 1. Namely, a case where the rotation speed of the low pressure side shaft 12 exceeds a predetermined value during the turning operation.

In a case where these abnormal events occur, the selector L30 outputs the value 0.0 generated by the signal generator L31 as the speed set value S34. By this control, in a case where an abnormal event occurs during the turning, the setting of the undesirable speed set value can be avoided.

The torque set value S28 is used for a control as the set value of the torque generated by the low pressure side shaft 12 under the torque control mode. In this case, the motor 16 undertakes a part of the torque as a helper motor which assists the load.

In the above description, some embodiments of the present invention are explained by taking an example of the two shaft gas turbine. However, also in a case of three or more shaft gas turbine, same operations and effects can be obtained. In such a case, the shaft which is driven as a common shaft with a compressor among the three or more shafts corresponds to the low pressure side shaft, and other shafts correspond to the high pressure side shaft.

In the above, the present invention is explained by referring to some embodiments. However, these embodiments are exemplified only for explaining the invention, and it is obvious for those skilled in the art that they are not to be referred to limit the meaning of the claims of the present invention.

The invention claimed is:

1. A compressor driving device configured to generate a driving power to drive a compressor, the compressor being connected to a multi-shaft gas turbine having a high pressure side shaft and a low pressure side shaft, and the low pressure side shaft of the gas turbine being connected to the compressor, wherein the compressor driving device comprises:

a motor configured to be coupled the compressor; and a control section configured to control the motor to generate a rotation speed of a turning of the compressor during a period when normal operation of the gas turbine is stopped, wherein the control section is further configured to carry out a helper motor drive mode in which an assist torque is generated by the motor in response to a detection signal for assisting a torque of the gas turbine when a torque generated by the gas turbine is lacking, during a period when the gas turbine is in normal operation.

2. The compressor driving device according to claim 1, wherein a turning of the low pressure side shaft is carried out with the turning of the compressor.

3. The compressor driving device according to claim 1, further comprising:

a low speed pickup sensor configured to detect a rotation speed of the low pressure side shaft when the turning of the compressor is carried out and output the detection signal indicating the detected rotation speed, wherein the control section is configured to control the motor based on the detection signal when the turning of the compressor is carried out.

4. The compressor driving device according to claim 3, wherein a rotation speed detection member is arranged on the low pressure side shaft at a position corresponding to the low speed pickup, the rotation speed detection member having a periodic convex and concave pattern, and the low speed pickup has a head and is configured to generate the detection signal in time series by detecting a distance between the head and the periodic convex and concave pattern of the rotation speed detection member.

5. The compressor driving device according to claim 3, further comprising:

a high speed pickup configured to detect a rotation speed of the low pressure side shaft and output the detected rotation speed as a helper motor rotation speed signal when the helper motor drive mode is being carried out, and wherein the control section is configured to control the motor based on the helper motor rotation speed signal when the helper motor drive mode is being carried out.

6. The compressor driving device according to claim 5, wherein the high speed pickup comprises a coil and is configured to generate the helper motor rotation speed detection signal based on a periodic variation of a current flowing through the coil generated by a moving of a periodic convex and concave pattern of a rotation speed detection member formed on the low pressure side shaft.

7. The compressor driving device according to claim 1, wherein the control section comprises a protection circuit configured to stop the turning of the compressor when a rotation speed of the low pressure side shaft exceeds a predetermined value.

8. A gas turbine plant comprising:

a multi-shaft gas turbine which comprises a high pressure side shaft and a low pressure side shaft;

a compressor connected to the low pressure side shaft; and a compressor driving device configured to generate a driving power of the compressor, wherein the compressor driving device comprises:

a motor coupled to the compressor; and a control section configured to control the motor to generate a rotation speed of a turning of the compressor during a period when normal operation of the gas turbine is stopped, wherein the control section is configured to carry out a helper motor drive mode in which an assist torque is generated by the motor in response to a detection signal for assisting a torque of the gas turbine when a torque generated by the gas turbine is lacking, during a period when the gas turbine is in normal operation.

9. A driving method of a compressor being connected to a low pressure side shaft of a multi-shaft gas turbine including a high pressure side shaft and the low pressure side shaft, the method comprising:

turning the compressor at a rotation speed using a motor during a period when normal operation of the gas turbine is stopped; and providing an assist torque to the gas turbine using the motor in response to a detection signal when a torque generated by the gas turbine is lacking during a period of when the gas turbine is in normal operation.

10. The method of claim 9, further comprising:

using a low speed pickup sensor to detect a rotation speed of the low pressure side shaft when the turning of the compressor is carried out and output the detection signal indicating the detected rotation speed; and controlling the motor based on the detection signal when the turning of the compressor is carried out.

11. The method of claim 10, further comprising:

providing a rotation speed detection member on the low pressure side shaft at a position corresponding to the low speed pickup, the rotation speed detection member having a periodic convex and concave pattern, and generating the detection signal using the low speed pickup by detecting a distance between a head of the low speed pickup and the periodic convex and concave pattern of the rotation speed detection member.

12. The method of claim 9, further comprising:

using a high speed pickup to detect a rotation speed of the low pressure side shaft and output the detection signal as a helper motor rotation speed signal during said providing the assist torque to the gas turbine using the motor; and controlling the motor based on the helper motor rotation speed signal during said providing the assist torque to the gas turbine using the motor.

13. The method of claim 12, wherein the high speed pickup comprises a coil, and wherein said outputting the detected rotation speed includes generating the helper motor rotation speed detection signal based on a periodic variation of a current flowing through the coil generated by a moving of a periodic convex and concave pattern of a rotation speed detection member formed on the low pressure side shaft.

14. The method of claim 9, further comprising stopping the turning of the compressor when a rotation speed of the low pressure side shaft exceeds a predetermined value.

* * * * *